United States Patent
Stanovich et al.

(10) Patent No.: US 6,834,412 B2
(45) Date of Patent: Dec. 28, 2004

(54) MOBILE AIR DUCT VACUUM

(75) Inventors: Michael A. Stanovich, Las Vegas, NV (US); Brian R. Coleman, Las Vegas, NV (US)

(73) Assignee: D.P.L. Enterprises, Inc., Las Vegas, NV (US)

(*) Notice: Subject to any disclaimer, the term of this patent is extended or adjusted under 35 U.S.C. 154(b) by 357 days.

(21) Appl. No.: 10/143,216

(22) Filed: May 7, 2002

(65) Prior Publication Data

US 2003/0208877 A1 Nov. 13, 2003

(51) Int. Cl.[7] .............................. A47L 9/14; A47L 9/24
(52) U.S. Cl. ...................... 15/327.2; 15/327.6; 15/353
(58) Field of Search ....................... 15/327.1, 327.2, 15/327.6, 347, 352, 353; 55/334, 429

(56) References Cited

U.S. PATENT DOCUMENTS

| | | | | |
|---|---|---|---|---|
| 2,539,195 A | * | 1/1951 | Lang ............................ | 55/368 |
| 2,652,902 A | * | 9/1953 | Sheahan ..................... | 55/373 |
| 2,656,097 A | * | 10/1953 | Sheahan ..................... | 417/363 |
| 2,937,396 A | * | 5/1960 | Momberg et al. ............. | 15/323 |
| 3,089,178 A | * | 5/1963 | Sherman, Jr. ................ | 15/347 |
| 3,101,889 A | * | 8/1963 | Tatge .......................... | 417/363 |
| 4,246,676 A | * | 1/1981 | Hallsworth et al. ........... | 15/353 |
| 4,792,363 A | | 12/1988 | Franklin, Jr. et al. | |
| 5,069,691 A | | 12/1991 | Travis et al. | |
| 5,171,340 A | * | 12/1992 | Karmel ....................... | 55/429 |
| 5,230,723 A | | 7/1993 | Travis et al. | |
| 5,388,301 A | * | 2/1995 | Bosyj et al. ............... | 15/327.1 |
| 5,400,463 A | * | 3/1995 | Attard et al. ................ | 15/326 |
| 5,433,763 A | | 7/1995 | Shagott et al. | |
| 5,438,729 A | | 8/1995 | Powell | |
| 5,512,086 A | | 4/1996 | Glucksman | |
| 5,584,093 A | | 12/1996 | Melendres | |
| 5,588,985 A | | 12/1996 | Shagott et al. | |
| 5,593,470 A | | 1/1997 | Shagott et al. | |
| 5,608,941 A | | 3/1997 | Kleinfeld | |
| 5,735,016 A | | 4/1998 | Allen et al. | |
| 5,813,089 A | | 9/1998 | Nolan et al. | |
| 5,868,858 A | | 2/1999 | Creed | |
| 5,870,798 A | * | 2/1999 | Crouser et al. ............... | 15/321 |
| 6,026,538 A | | 2/2000 | Watanabe | |
| 6,158,080 A | * | 12/2000 | Schlapkohl .................. | 15/301 |
| 2001/0005919 A1 | * | 7/2001 | Worden et al. ............... | 15/413 |

* cited by examiner

*Primary Examiner*—Terrence R. Till
(74) *Attorney, Agent, or Firm*—Rob L. Phillips; Quirk & Tratos

(57) ABSTRACT

A mobile air duct vacuum provides an efficient method for cleaning HVAC ductwork in nearly any location. Upper and lower sections of circular cross-section are removably connected defining an air passageway. Said upper section houses 1st, 2nd and 3rd stage filters for insuring that "dirty" air passing through the system is thoroughly cleaned. Said lower section houses an air directional unit, blower wheel and motor. The motor causes the blower wheel, having spaced blades, to rotate and draw air from within the subject ductwork and through the filters thereby effectuating the cleaning. Thereafter, the clean air passes through the air directional unit into the blower wheel where it is re-directed to the surrounding environment through vents in the lower section. Wheels and a handle provide for a mobile air duct vacuum. To facilitate transportation of the vacuum the upper section and lower section can be readily disjoined.

16 Claims, 5 Drawing Sheets

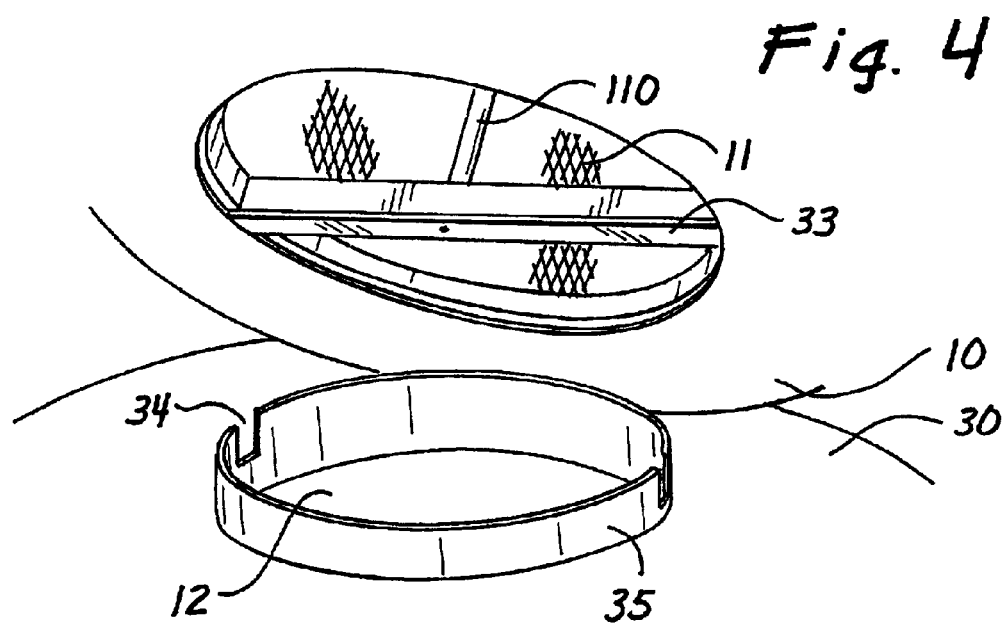
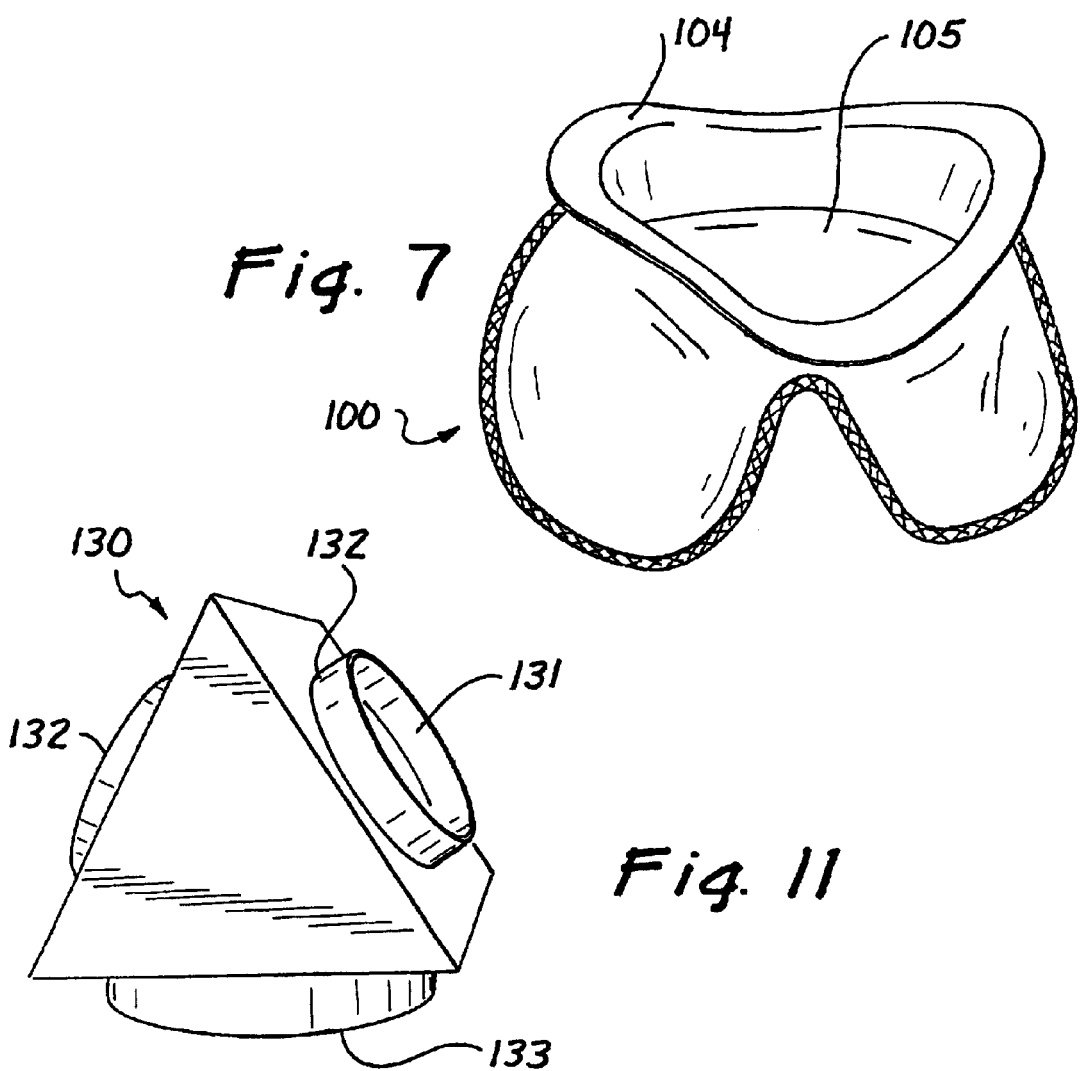

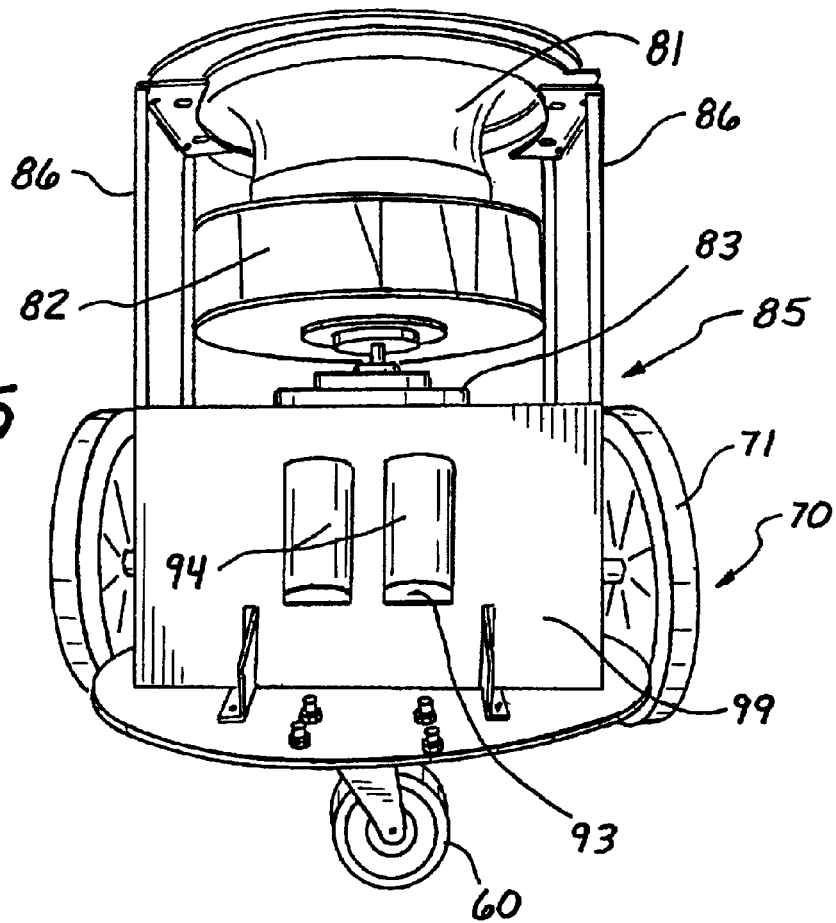
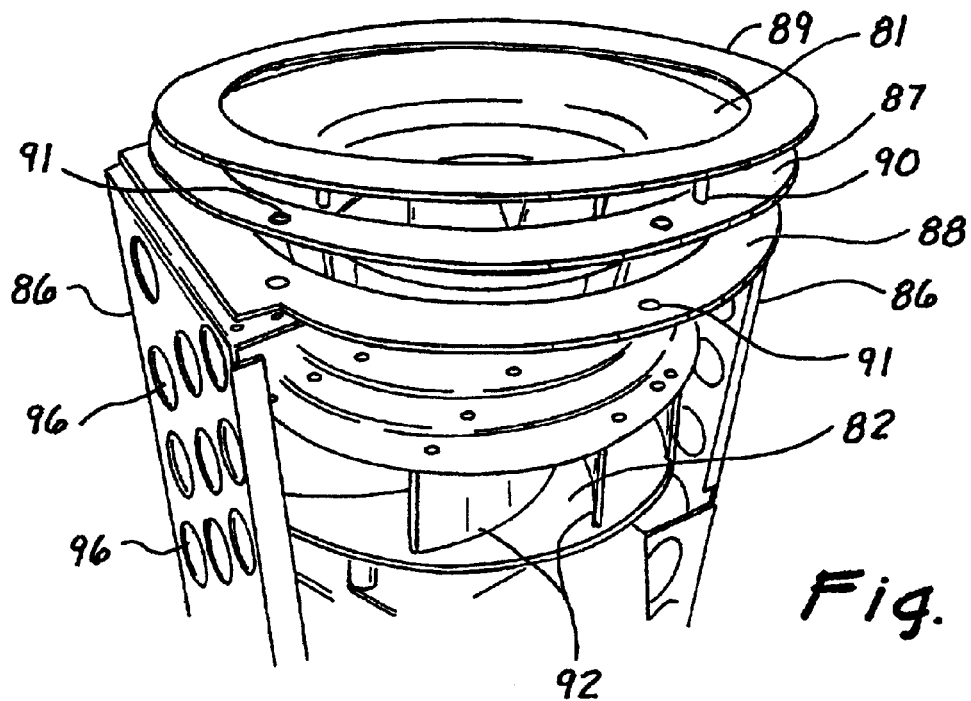

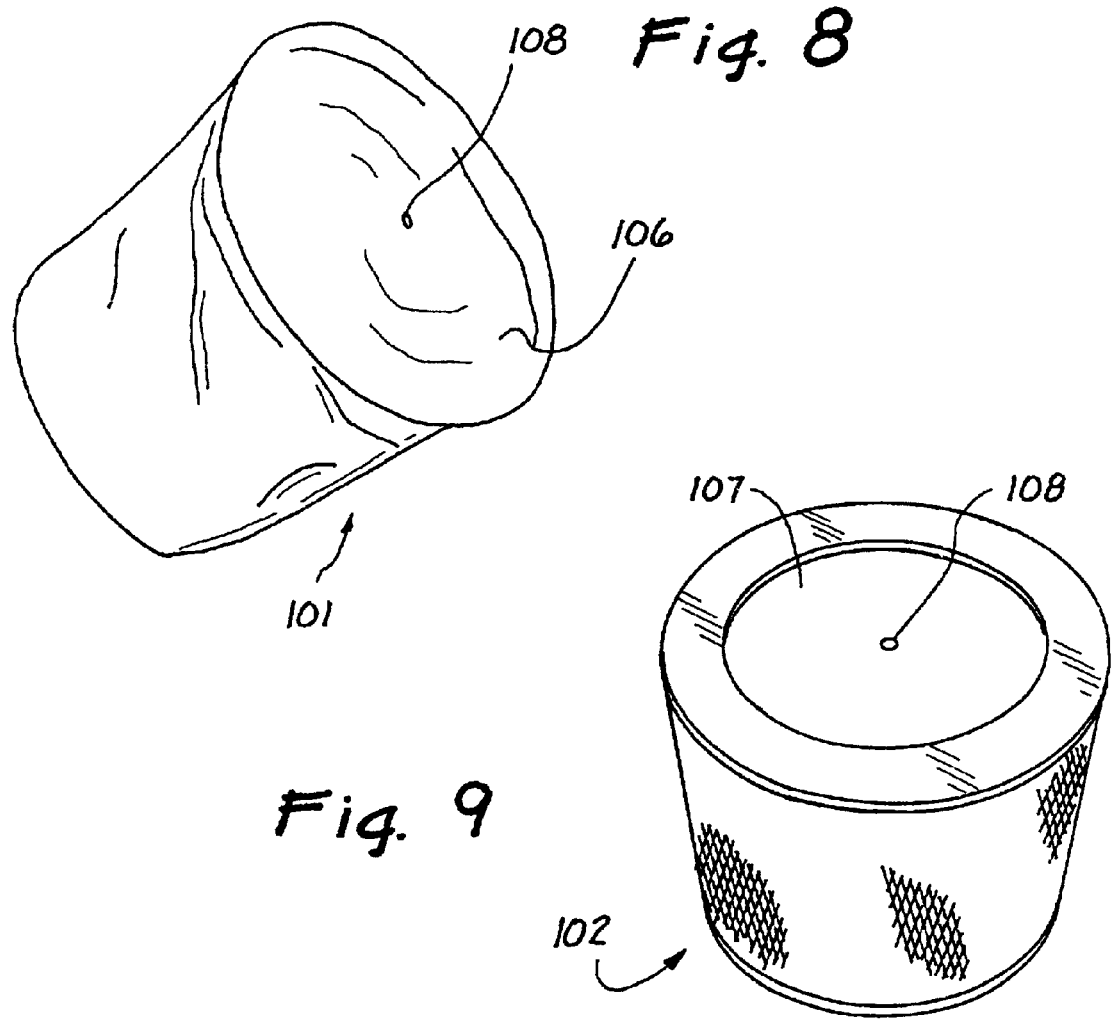

MOBILE AIR DUCT VACUUM

FIELD OF INVENTION

The present invention relates generally to the field of air duct cleaning. More particularly, this invention relates to a mobile system for cleaning heating, ventilation and air conditioning ("HVAC") ductwork.

DESCRIPTION OF THE PRIOR ART

Systems and units for cleaning HVAC ductwork are prominent in the patent literature. The cleaning of HVAC ductwork is typically accomplished by pulling the air, including dust, debris, particulate matter and the like, from within the ductwork and passing said air through a filter system. Systems may also incorporate uniquely designed brushes. For example, U.S. Pat. Nos. 4,792,363, 5,608,941, 5,735,016 and 5,813,089 disclose brushes designed to forcibly remove attached debris from the inner walls of air ducts. As important as an exhaustive cleaning of the HVAC ductwork, is a ductwork cleaning unit that facilitates convenient access to all possible air duct systems.

U.S. Pat. No. 5,230,723 (the '723 patent) discloses a "Portable Filtration Unit" including individual modules designed to reach some smaller locations. The separate modules contain various filters and can be set up by a single person. In the preferred embodiment of the '723 patent, the unit includes modules which are rectangular in cross-section. In fact, the shape of filters therein dictate that the modules be rectangular to contain said filters. The rectangular modules of the unit disclosed are inefficient for both filtering the air and creating a lightweight unit. Further, corners of the rectangular modules cause damage, during movement of the unit, since the corners contact walls or other interior fixtures of a building.

U.S. Pat. No. 5,438,729 (the '729 patent) discloses an "Apparatus For Cleaning Air Ducts" including a portable cleaning unit that incorporates a pneumatically driven agitator for insertion into an air duct. Again, the portable unit includes individual sections of a rectangular cross-section. As with the '723 patent, the rectangular unit is inefficient, heavy and damage prone.

The present invention overcomes the referenced inadequacies existing in the prior art, namely the inefficiencies related to filtering the air, weight and damage. By utilizing a circular cross-section, the present invention provides maximum efficiency, a light-weight design and damage control.

SUMMARY OF THE INVENTION

An object of the present invention is to provide an efficient mobile air duct vacuum.

Another object of the present invention is to provide a light-weight mobile air duct cleaning system.

Another object of the present invention is to provide a mobile air duct vacuum resistant to causing damage.

Another object of the present invention is to provide a stable multi-section mobile air duct vacuum.

Another object of the present invention is to provide a mobile air duct vacuum capable of being transported in an automobile or similar type vehicle.

Another object of the present invention is to provide a mobile air duct vacuum operable by one person.

Yet another object of the present invention is to provide a mobile air duct vacuum capable of easy assembly and disassembly.

DISCLOSURE OF THE INVENTION

The present invention consists of upper and lower circular sections removably connected to one another. A motor in the lower section drives a blower wheel that draws air through a hose attached at one end to the mobile air duct vacuum and at a second end to an air duct system. With the present invention, air entering the upper section is filtered through a 1st stage filter, a 2nd stage filter and a 3rd stage filter prior to entering the lower section through a common passageway between the upper and lower sections. Air exits the system through vents in a skin of the lower section.

The lower section of the present invention houses the motor and blower wheel. Two large diameter wheels attached to an enclosed axle supported by the lower section and a swivel wheel provide a mobile air duct vacuum. A handle is secured to the upper section between the placement of the large wheels. The handle and large wheels allow the mobile air duct vacuum to be moved in a manner akin to a "dolly" or "two-wheeler" and are best suited for moving the vacuum up and down stairs or the like. Moreover, the handle allows the mobile air duct cleaning vacuum to be laid down and operated horizontally. The swivel wheel provides for a wide range of movement while the air duct vacuum is in an upright position.

The common passageway between the upper and lower sections is defined by corresponding circular openings in both sections and a collar encompassing the lower circular opening and extending from an upper surface of said lower section. Upon connection, by means of first latch mechanisms, of the upper section to the lower section said collar inserts into the circular opening of the upper section thereby joining the two sections. A crosspiece traversing the opening in the upper section is designed to reside in corresponding recesses of the collar to insure proper alignment and additional rigidity of the two section connection.

A cover with hose adapters attaches to said upper section to complete the system. The cover attaches to the upper section by means of second latch mechanisms. During use, various covers including different adapters may be removably attached to said upper section to provide means for interconnecting one or more hoses between the mobile air duct vacuum and a particular HVAC ductwork system. An adapter with two openings may be used to create more flow by connecting one opening to a second mobile air duct unit and the second openings to the duct system. Increasing the flow may be necessary with larger and/or longer duct systems.

BRIEF DESCRIPTION OF THE DRAWINGS

FIG. 4 is a perspective view illustrating the upper section disjoined from said lower section;

FIG. 5 is a perspective view of the lower section (with a shell removed) illustrating an air directional unit, blower wheel and motor;

FIG. 6 is a perspective view of an air directional unit of the present invention;

FIG. 7 is a perspective view of a 1st stage filter of the present invention;

FIG. 8 is a perspective view of a 2nd stage filter of the present invention;

FIG. 9 is a perspective view of a 3rd stage filter of the present invention; and FIG. 10 is a rear view of the lower section illustrating a power cord, on-off switch and circuit breaker of the lower section of the present invention.

FIG. 11 is a perspective view of a plenum adapter having two 8" openings for attachment of two 8" hoses.

DESCRIPTION OF THE EMBODIMENTS

Figure 1:
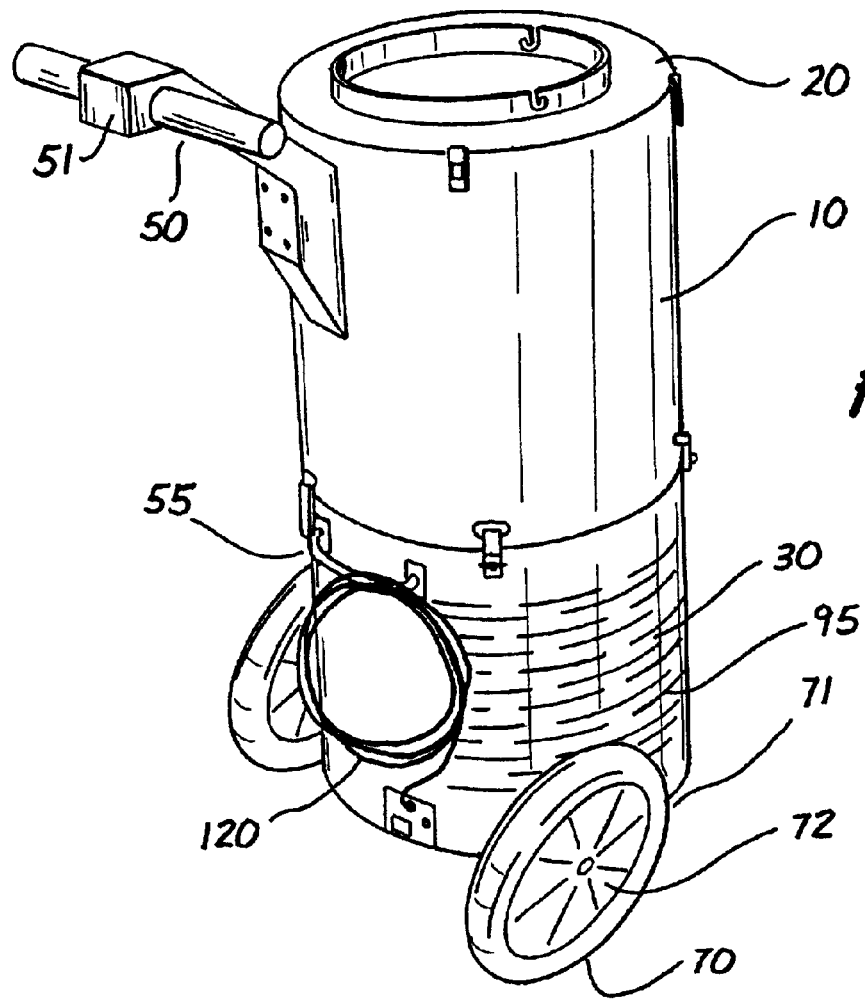
FIG. 1 is a perspective top/side view of the present invention as assembled.

Reference is now made to the figures wherein like parts are referred to by like numerals throughout. FIG. 1 shows the mobile air duct vacuum as assembled including an upper section 10, a cover 20, a lower section 30, a handle 50 and rear wheels 70.

Figure 1A:
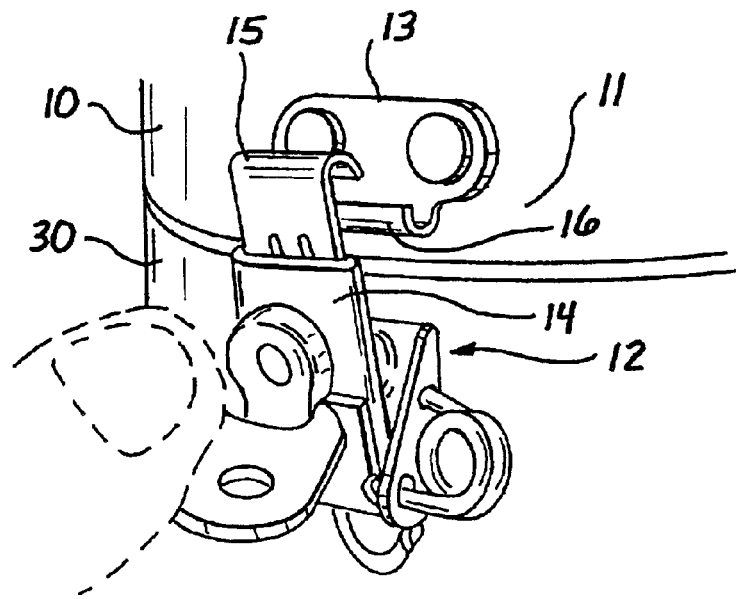
FIG. 1A is a detailed view of a latch mechanism used to attach an upper section and a lower section of the present invention.

FIG. 1A illustrates a first latch mechanism 11 a plurality of which removably secure said upper section 10 to said lower section 30. Said latch mechanisms 11 consist of a primary member 12 rigidly connected to an outer surface of said lower section 30 for detachable engagement with a corresponding secondary member 13 rigidly connected to an outer surface of said upper section 10. Said primary member 12 includes a rotatable arm 14 having an extendable first lip 15 for engagement with an oppositely positioned second lip 16 of the secondary unit 13. Said primary member 12 includes spring biased means for locking said first lip 15 in engagement with said second lip 16. In a preferred embodiment, four equally spaced latch mechanisms 11 removably secure said upper section 10 to said lower section 30.

Figure 2:
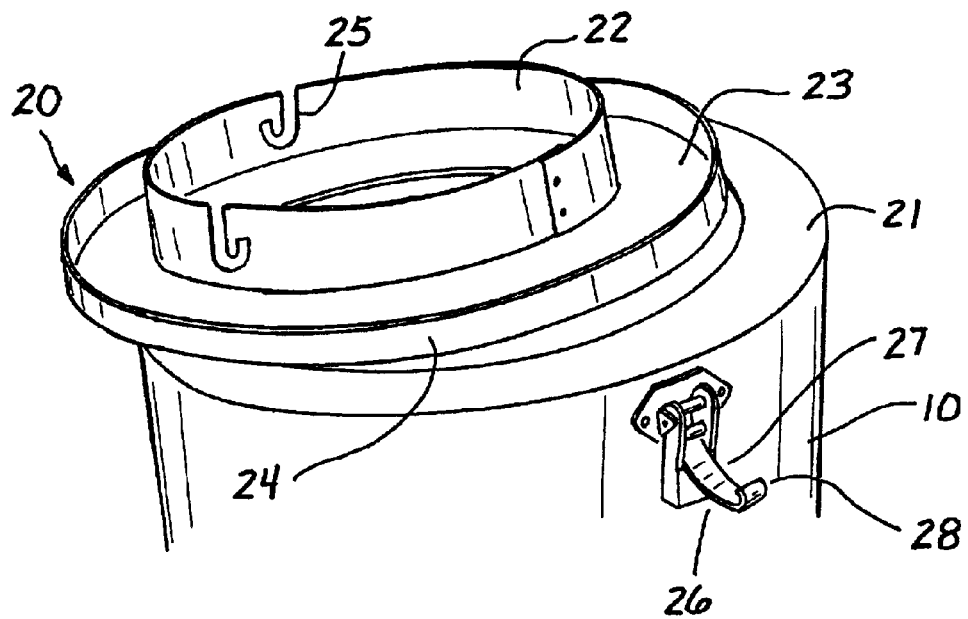
FIG. 2 is a perspective view of a cover and a latch mechanism (disengaged) used to join said cover to said upper section of the present invention.

Now referring to FIG. 2, a circular cover 20 is supported by a circular shelf 21 which circumscribes an inner surface of said upper section 10 and is spaced from a top of said upper section 10. The cover 20 includes a 12" hose adapter 22 providing a passageway for "dirty" air to enter the air duct vacuum. Said hose adapter 22 extends upward from a planar surface 23 that extends radially to a vertical ring 24 that encircles an outer perimeter of said cover 20. When in place, said vertical ring 24 abuts the inner surface of said upper section 10 and extends upward slightly above the confines of the upper section 10. A plurality of J-shaped cutouts 25 in the hose adapter 22 provide a means for securing a hose thereto. In an alternative embodiment, the cover 20 receives an adapter 130 (shown in FIG. 11) having two 8" openings for multiple 8" hose attachments. The multiple openings provide means to connect hoses to both a supply and return duct simultaneously to reduce cleaning time or both hoses can be attached to a single supply duct line that is not large enough for the 12" hose adapter 22. Alternatively, one 8" opening can be closed off while the second 8" opening is used to clean smaller duct work systems.

The cover 20 is retained in position by latch mechanisms 26 rigidly connected to an outer surface of the upper section 10. Latch mechanisms 26 are single units including arms 27 having curved ends 28 for removably retaining said cover 20 in place. In practice, said curved ends 28 grip the vertical ring 24 and are held in place by locking means incorporated in said latch mechanisms 26. Preferably four equally spaced latch mechanisms 26 retain said cover 20 in place.

Figure 3:
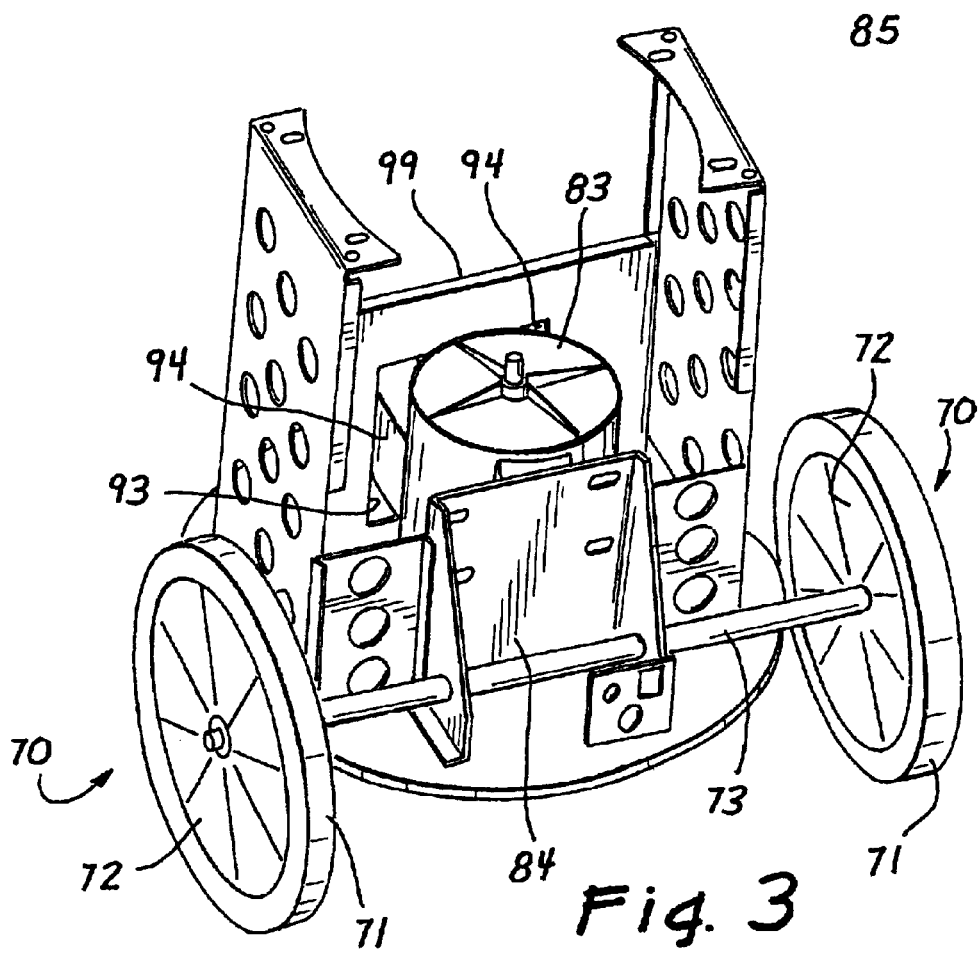
FIG. 3 is a perspective view of the lower section (with a skin, air directional unit, and blower wheel removed) illustrating an enclosed axle and frame member.

FIGS. 1 and 3 illustrate a handle 50 and rear wheels 70 which provide the present invention with mobility. The handle 50 is connected to the upper section 10 between placement of said rear wheels 70 and adjacent the cover 20. The two rear wheels 70 include solid rubber tires 71 disposed on rims 72 joined by an enclosed rear wheel axle 73 extending from the first rear wheel 70, through the lower section 30 by means of openings 76 (shown in FIG. 10) therein, to the second rear wheel 70. Said enclosed rear wheel axle 73 is rigidly secured to the lower section 30 by passing through a horizontal frame member 84 of a fixed frame assembly 85 contained within said lower section 30.

The handle 50 is rigidly secured to the upper section 10 near a top thereof by conventional means. The handle 50 includes a flat surface 51 for positioning the mobile air duct vacuum in a horizontal orientation when necessary. In the upright vertical orientation the handle 50 is used to lean the mobile air duct vacuum in a rearward direction thus placing the total weight of the vacuum on the rear wheels 70. In this fashion the vacuum may be easily and accurately controlled by a user in a manner similar to a dolly or hand truck. Moreover, moving said vacuum up and down stairs or the like is easily accomplished. A front swivel wheel 60 (shown in FIG. 5) provides a method of controlling the air duct vacuum while said vacuum is in an upright position. Said front swivel wheel is rigidly connected to a lower surface of said lower section 30 by means of a plurality of conventional nut and bolt arrangements.

The upper section 10 is lightweight and can be carried by one person independently of said lower section 30. For example, a particular HVAC ductwork system may dictate that said vacuum be moved into position through a small confined space requiring the air duct vacuum to be moved into position in two separate sections. Now referring to FIG. 4, said upper section 10 is disjoined from said lower section 30 exposing the interconnection therebetween. Openings 11, 12, in the upper section 10 and lower section 30 respectively, align providing an air passageway from the upper section 10 to the lower section 30. A collar 35 extending upwardly from an upper surface of said lower section 30 circumscribes opening 12. To connect the upper section 10 to the lower section 30, said collar 35 is inserted into opening 11 to provide a stable interaction between the upper and lower sections 10, 30. To provide proper alignment between said upper and lower sections 10, 30, a crosspiece 33 bisecting opening 11 corresponds to, and resides within, oppositely positioned recesses 34 in said collar 35. The crosspiece 33 and corresponding recesses 34 also prevent said upper section 10 from independently rotating about the lower section 30.

Now referring to FIG. 5, said lower section 30 holds an air directional unit 81, a blower wheel 82 and a motor 83 rigidly connected in series. The fixed frame assembly 85 having two vertical arms 86 is secured to a bottom surface of said lower section 30 and supports said directional unit 81, wheel 82 and motor 83. A support plate 99 supports the fixed frame assembly 85 and includes cut-outs 93 to accommodate motor capacitors 94. Also shown in FIG. 5, is the front swivel wheel 60 and its preferred conventional nut and bolt connection means.

As illustrated in FIG. 6, preferably said air directional unit 81 is in the shape of a conical frustrum having a planar rim 87 around a first end, preferably the end of the frustrum with a larger diameter, for retaining said unit 81. Said air directional unit 81 is removably retained by positioning said planar rim 87 between a first ring 88 rigidly connected to upper surfaces of said two arms 86 and a second independent ring 89 having projections 90 extending from a bottom surface, said projections 90 insert into, and through, corresponding apertures 91 in the planar rim 86 and the first ring 88 thereby aligning and retaining the air directional unit 81 between said rings 88, 89. Said air directional unit 81 directs filtered air through a blower wheel 82 that re-directs the air through vents 95 (shown in FIG. 1) in said lower section 30. Said fixed frame assembly 85 includes a plurality of openings 96 to facilitate the re-direction of air through vents 95 in said lower section 30.

The blower wheel 82 includes radially spaced blades 92 for trapping and redirecting air during the rotation of the wheel 82. Said blower wheel 82 is rotated by motor 83 thereby pulling "dirty" air from subject ductwork into the air duct vacuum and re-directing said air through vents 95 in the skin of the lower section 30. In a preferred embodiment a 1.5 horsepower motor drives the blower wheel 82 of the present system. However, larger or smaller motors may be utilized to drive the blower wheel 82 of the present invention.

Now referring to FIGS. 7, 8 and 9, a 1st stage bag filter 100, a 2nd stage filter 101 and a 3rd stage filter 102 are depicted as removed from the confines of the upper section 10. The 1st stage filter 100 is fabricated of a pliable material and includes a flange 104 that is used to hold said filter 100 in place upon said circular shelf 21 (shown in FIG. 2) by said circular cover 20 (shown in FIG. 1). Preferably the 1st stage filter 100 is made of 200 Micron polyester singed on an inside surface 105. The 2nd stage filter 101 is a cylinder of a pliable material having a rigid end plate 106. Preferably the 2nd stage filter 101 is made of 100 micron woven monofilament nylon. The 3rd stage filter 102 is a rigid cylinder having a rigid end plate 107. Preferably the 3rd stage filter is a high efficiency particulate canister with a pleated paper element (approximately 5 micron). Said 3rd stage filter 102 is disposed within said 2nd stage filter 101 such that their respective rigid end plates 107, 106 are aligned adjacent to one another. The 2nd and 3rd stage filter 101, 102 combination is aligned below the 1st stage filter such that the "dirty" air passes through the 1st stage filter 100, 2nd stage filter 101 and 3rd stage filter 102 in succession. Although the material of the filters has been described with specificity, it should be understood that said filter material can be any suitable material capable of filtering air of particulate matter, contaminants and the like.

The plate covers 106, 107 each have a centrally located aperture 108 for securing said filters 101, 102 in place. Said apertures 108 are in vertical alignment when the 3rd stage filter 102 is disposed within the 2nd stage filter 101 A rod 110 (shown in FIG. 4) having two threaded ends extends through the 2nd and 3rd stage filters 101, 102 such that a first end passes through the aligned apertures 108 in the plate covers 106, 107. A wing nut retains said first end of said rod 110 in place adjacent said plate covers 106, 107. A second end of the rod 110 passes through an opening in the crosspiece 33 and is rigidly attached thereto with a PEM nut and jam nut, having an integrated star washer, on the rod. In this manner, the wing nut facilitates the simple changing of the 2nd and 3rd stage filters 101, 102 when necessary and the tightening of said filters 101, 102 in place during use of the air duct vacuum.

Power is supplied to the air duct vacuum by an electrical connection to a standard 120 volt, or 220 volt, electrical outlet. As depicted in FIG. 10, a power cord 120 provides the necessary electrical connection between the air duct vacuum and the outlet. The power cord 120 penetrates the lower section 30 through plate 121 adjacent a lower portion of said lower section 30. Preferably the plate 121 is adjacent a rear portion of the air duct vacuum to permit a user to manipulate and avoid said power cord 120 while using the air duct vacuum. A second handle 55 (shown in FIG. 1) attached to said lower section 30 provides a user with means for carrying said lower section 30 as described herein. An on-off switch 122 and circuit breaker 123 are located adjacent said power cord 120 on said plate 121.

FIG. 11 is a perspective view of a plenum adapter 130 having two 8" openings 131 having collars 132 for attachment of two 8" hoses. The adapter 130 includes a collar 133 for attachment to said cover 20 of said upper section 10 of the mobile vacuum air duct vacuum.

Although the invention has been described in detail with reference to a preferred embodiment, additional variations and modifications exist within the scope and spirit of the invention as described and defined in the following claims. By way of an example, both the first and second latch mechanisms described above may be designed differently without departing from the scope and spirit of the present invention.

We claim:

1. A mobile air duct vacuum for removable attachment to an air duct system for cleaning said air duct system including:

an upper section and a lower section each of circular cross-section, said upper section removably attached to said lower section, said upper section and lower section having a common passageway therebetween for drawn air to travel through;

a cover including one or more hose adapters removably attached to a top of said upper section;

said upper section housing one or more air filters for filtering said drawn air of particulate matter;

said lower section housing means for drawing air from an air duct system through one or more hoses, said one or more hoses attached at a first end to said one or more hose adapters and at a second end to the air duct system, said air being drawn and directed through said upper section filters and said passageway into the lower section of said mobile air duct vacuum, said lower section having a plurality of slots therein to allow the filtered air to be expelled to the atmosphere;

said lower section further housing an air directional unit placed above said means for drawing air into said air duct vacuum; and means for transporting said air duct vacuum including a handle affixed to said upper section and two or more wheels affixed to said lower section.

2. The mobile air duct vacuum according to claim 1 wherein said air directional unit is in the shape of a conical frustrum.

3. The mobile air duct vacuum according to claim 1 wherein said upper section and lower section are removably attached by means of corresponding latch mechanisms secured to outer surfaces of said upper and lower sections.

4. The mobile air duct vacuum according to claim 1 wherein said cover includes one 12" hose adapter.

5. The mobile air duct vacuum according to claim 1 wherein said cover includes two 8" hose adapters.

6. The mobile air duct vacuum according to claim 1 wherein said means for drawing air from the air duct system into said upper section is a blower wheel.

7. The mobile air duct vacuum according to claim 1 wherein said common passageway comprises corresponding circular openings in a lower surface of said upper section and an upper surface of said lower section.

8. The mobile air duct vacuum according to claim 7 wherein said attachment of the upper section to the lower section is facilitated by a collar circumscribing and extending upwardly from said lower section opening, said collar inserting into said upper section opening upon attachment of the two sections.

9. The mobile air duct vacuum according to claim 8 wherein said collar includes notches therein, said notches situated to receive a cross-piece bisecting said upper section opening to ensure proper alignment of the upper section and lower section upon attachment of the two sections.

10. The mobile air duct vacuum according to claim 1 wherein the upper section houses a plurality of filters in series such that air passes through each one of the plurality of filters in succession.

11. The mobile air duct vacuum according to claim 1 wherein said one or more wheels comprise two rear wheels of sufficient diameter to facilitate transporting the air duct vacuum up stairs and a front swivel wheel to facilitate maneuverability on flat surfaces.

12. The mobile air duct vacuum according to claim 1 wherein said lower section includes a handle for facilitating transport of the lower section independently of the upper section when the two sections are not attached.

13. A mobile air duct vacuum for removable attachment to an air duct system for cleaning said air duct system including:
- an upper section and a lower section each of circular cross-section, said upper section removably attached to said lower section, said upper section and lower section having a common passageway therebetween for drawn air to travel through;
- a cover including two 8" hose adapters removably attached to a top of said upper section;
- said upper section housing one or more air filters for filtering said drawn air of particulate matter;
- said lower section housing means for drawing air from an air duct system through one or more hoses, said one or more hoses attached at a first end to said one or more hose adapters and at a second end to the air duct system, said air being drawn and directed through said upper section filters and said passageway into the lower section of said mobile air duct vacuum, said lower section having a plurality of slots therein to allow the filtered air to be expelled to the atmosphere; and
- means for transporting said air duct vacuum including a handle affixed to said upper section and two or more wheels affixed to said lower section.

14. A mobile air duct vacuum for removable attachment to an air duct system for cleaning said air duct system including:
- an upper section and a lower section each of circular cross-section, said upper section removably attached to said lower section, said attachment of the upper section to the lower section being facilitated by a collar circumscribing and extending upwardly from said lower section opening, said collar inserting into said upper section opening upon attachment of the two sections, said upper section and lower section having a common passageway therebetween for drawn air to travel through;
- a cover including one or more hose adapters removably attached to a top of said upper section;
- said upper section housing one or more air filters for filtering said drawn air of particulate matter;
- said lower section housing means for drawing air from an air duct system through one or more hoses, said one or more hoses attached at a first end to said one or more hose adapters and at a second end to the air duct system, said air being drawn and directed through said upper section filters and said passageway into the lower section of said mobile air duct vacuum, said lower section having a plurality of slots therein to allow the filtered air to be expelled to the atmosphere; and
- means for transporting said air duct vacuum including a handle affixed to said upper section and two or more wheels affixed to said lower section.

15. The mobile air duct vacuum according to claim 14 wherein said collar includes notches therein, said notches situated to receive a cross-piece bisecting said upper section opening to ensure proper alignment of the upper section and lower section upon attachment of the two sections.

16. A mobile air duct vacuum for removable attachment to an air duct system for cleaning said air duct system including:
- an upper section and a lower section each of circular cross-section, said upper section removably attached to said lower section, said upper section and lower section having a common passageway therebetween for drawn air to travel through;
- a cover including one or more hose adapters removably attached to a top of said upper section;
- said upper section housing one or more air filters for filtering said drawn air of particulate matter;
- said lower section housing means for drawing air from an air duct system through one or more hoses, said one or more hoses attached at a first end to said one or more hose adapters and at a second end to the air duct system, said air being drawn and directed through said upper section filters and said passageway into the lower section of said mobile air duct vacuum, said lower section having a plurality of slots therein to allow the filtered air to be expelled to the atmosphere;
- said lower section further includes a handle for facilitating transport of the lower section independently of the upper section when the two sections are not attached; and
- means for transporting said air duct vacuum including a handle affixed to said upper section and two or more wheels affixed to said lower section.

* * * * *